(12) United States Patent
Ginzton et al.

(10) Patent No.: US 8,782,310 B1
(45) Date of Patent: Jul. 15, 2014

(54) USE OF MOBILE DEVICES FOR USER INPUT AND OUTPUT

(75) Inventors: Matthew David Ginzton, San Francisco, CA (US); Dustin Michael Byford, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 299 days.

(21) Appl. No.: 13/435,366

(22) Filed: Mar. 30, 2012

(51) Int. Cl.
*G06F 13/00* (2006.01)

(52) U.S. Cl.
USPC .......................................................... 710/104

(58) Field of Classification Search
None
See application file for complete search history.

(56) References Cited

U.S. PATENT DOCUMENTS

2012/0270597 A1* 10/2012 Ou .............................. 455/556.1

* cited by examiner

*Primary Examiner* — Henry Tsai
*Assistant Examiner* — Juanito Borromeo (57) ABSTRACT

A system for connecting the plurality of mobile devices to a computer is disclosed. The system includes a plurality of mobile devices connected to a computer through a network. Each of the plurality of mobile devices includes a mobile application configured to emulate the each of the plurality of mobile devices as a selected type of input/output (I/O) device for the computer. An operating system of the computer operates in conjunction with a session manager to connect the plurality of mobile devices as disparate selected types of I/O devices to the computer in a common user session.

22 Claims, 4 Drawing Sheets

USE OF MOBILE DEVICES FOR USER INPUT AND OUTPUT

BACKGROUND

The explosive growth in the use of mobile devices in the recent years has encouraged development of powerful mobile devices that are capable of providing many computing functions that were traditionally limited to desktop or laptop computers. Users of mobile devices (e.g., smart phones, tablet devices, and the like) can now use these mobile devices to perform functions such as emailing, browsing the Internet, playing games, personal and professional networking via the Internet, etc.

The convenience of mobile, touch-enabled devices has lent them to many uses beyond directly accessing mobile "apps" viewing email, and browsing the web. One such use is the ability to remotely access a full desktop system using such products as LogMeIn™, Splashtop®, PocketCloud®, WebEx®, VMware View™, virtual network computing (VNC), and many others. Using these products, a user can connect to a target personal computer and interact with its user interface, e.g., view the display and input keyboard and mouse commands, via the mobile device. However, despite their popularity, these mobile devices are marred with a fundamental problem of having a small display screen, which often results in an unsatisfying user experience. As a result, the use of mobile devices for remote personal computer access is generally considered to be unsuitable for office productivity.

SUMMARY

In one embodiment, a method for connecting a plurality of mobile devices to a computer is described. The computer includes an operating system and the plurality of mobile devices includes a first mobile device and a second mobile device. Each of the plurality of mobile devices includes a mobile application. A user session is started by connecting to the computer from the first mobile device. To make the connection, user authentication data is sent to the computer. Then, through the mobile application that is running in the first mobile device, a first message is received at the computer to connect the first mobile device as a first type of input/output (I/O) device. On receiving the first message, the computer is configured to use the first mobile device as the first type of I/O device. Maintaining the same user session, the second mobile device is connected to the computer. Maintaining the same user session means sending the same user authentication data to the computer. Through the mobile application that is running in the second mobile device, a second message is received at the computer to connect the second mobile device as a second type of input/output (I/O) device. On receiving the second message, the computer is configured to use the second mobile device as the second type of I/O device.

DETAILED DESCRIPTION

Figure 1:
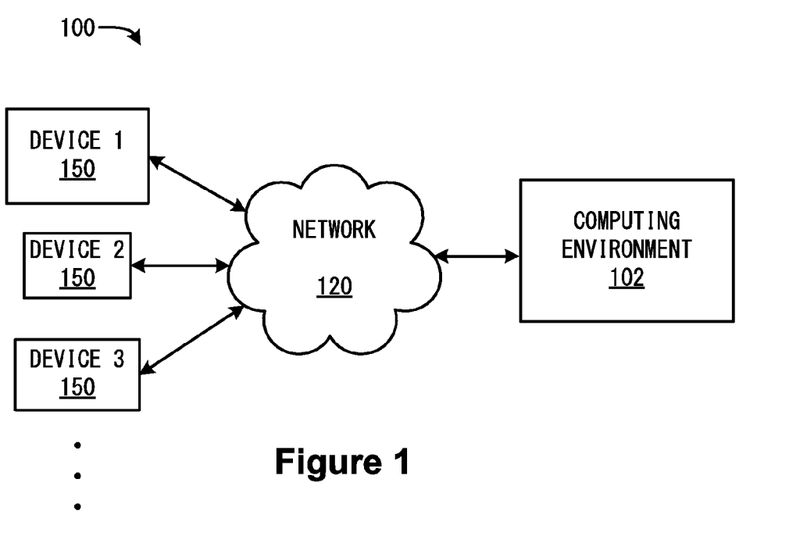
FIG. 1 illustrates a logical diagram of a system for providing interactions between mobile devices and computing systems.

FIG. 1 illustrates, by way of example, a logical diagram of a system 100 including a computing environment 102 and devices 150. As shown, a plurality of devices 150 are connected to computing environment 102 through network 120. Network 120 may include a Local Area Network (LAN) or a Wide Area Network (WAN), such as the Internet, and may be implemented through wired or wireless technologies, or any combination of the above. Devices 150 may include any handheld or mobile device (e.g., tablet computer, mobile phone, etc.) that is capable of connecting to a data network and exchange data with another device or computer connected to the same data network.

Note that computing environment 102 may be an individual computer system or a complex network of a plurality of computers, including virtual computers, connected together in a data network, which may be the same as network 120 or may be a different data network (e.g., a private network, which may be connected to network 120 through a firewall). In one embodiment, network 120 may be a private network, which may be accessible by the devices 150 through a virtual private network (VPN) tunnel over the Internet. Computing environment 102 may also include associated parts (e.g., databases, network switches, etc.) (not separately shown). In one embodiment, computing environment 102 may be a public or a private cloud computing environment that may include shared computing resources provided to the users on demand.

In one embodiment, computing environment 102 includes a virtual desktop infrastructure (VDI). In such an infrastructure, virtual computers (not separately shown) are accessible via a connection broker (not separately shown) for remote access by users. The virtual computers therefore can be interacted with remotely over desktop remoting protocol such as RDP from Microsoft or PC over IP (PCoIP®)—a desktop remoting protocol available from Teradici Corporation. Virtualization of computer resources generally connotes the abstraction of computer hardware, which essentially separates operating systems and applications from direct correlation to specific hardware. Hardware is therefore abstracted to enable multiple operating systems and applications to share hardware resources. As a result, each physical server of a virtual desktop infrastructure may have running thereon a large number of virtual machine "guests," each with a desktop operating system, such as Windows, and application software, and each VM can be individually accessed by users at remote locations. VDIs are well known; more information regarding VDIs may be obtained from U.S. Patent Application Publication 2011/0184993, published Jul. 28, 2011, incorporated herein by reference.

Referring to FIG. 1, a user may configure a plurality of devices 150 to connect to a same target computer in computing environment 102. For example, during a computing session of a computer, a user may advantageously use a tablet computer such as an iPad™ as a computer monitor, a smart phone such as an iPhone™ as a keyboard and another smart device, such as an ipod Touch™ as a touchpad or pointing device. That is, each of these devices may be simultaneously connected to a target computer in a single user session and operate (using software running on the device) as a different input/output (I/O) device. For example, in a same user session, Device 1 may be used to display output from a computer and Device 2 may be connected to receive input from the user and transmit the user input to the computer. More than one device 150 may also be connected as a same type of I/O device. For example, two devices 150 may be connected as monitors, and each can show a different portion of a display generated by the target computer. Alternatively, two users in different locations can share a single user session by displaying the same portion of the generated display. In another use case, a single device 150 may connect as a monitor as well as a mouse (e.g., using touch-screen functionality of the device) and a different device 150 may connect as a keyboard. Also, one device 150 may provide input and another device 150 may receive output based on the input provided by the other device 150.

Devices 150 that are connected to the target computer in the single user session may be dynamic. For example, a user may connect a first device 150, then later connect a second device 150 and a third device 150. Then, the user may disconnect third device 150 and connect a fourth device 150. The layout and usage of device 150 is dynamic and flexible and could change over time. A device 150 may join as a keyboard, then another device 150 may join as a keyboard and repurpose the first device 150 as a touchpad.

Figure 2:
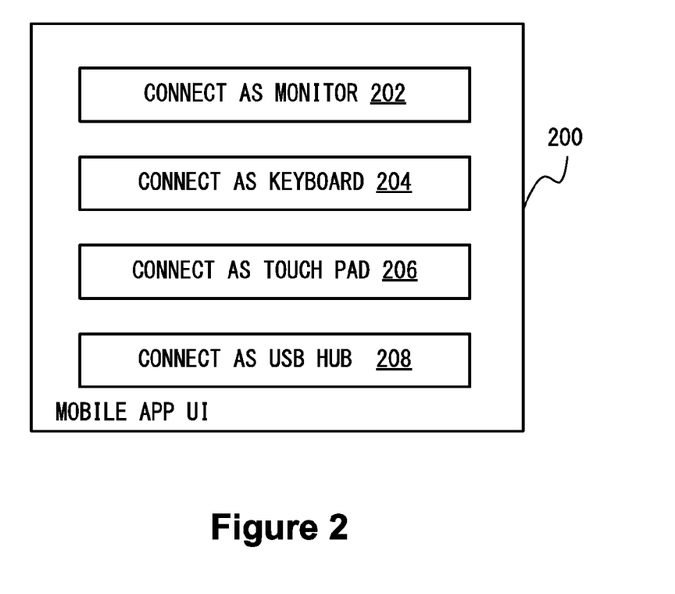
FIG. 2 illustrates an exemplary user interface of an exemplary mobile application.

FIG. 2 illustrates an exemplary user interface (UI) 200 of an exemplary mobile application. In one embodiment, each device 150 includes a mobile application to facilitate configuration of device 150 to be used as an I/O device for a remote computer. UI 200 includes control to enable a user of a device 150 to configure device 150 as a selected type of I/O device. For example, UI 200 includes a "connect as monitor" option 202 to enable a user to configure the device to be used as a computer monitor. Similarly, a "connect as keyboard" option 204 may be used to configure the a device to be connected as a keyboard to the computer via network 120, a "connect as touch pad" option 206 may be used to connect the device as a mouse touch pad to the computer. A "connect as USB hub" option 208 may be used to connect a USB hub that is connected either to network 120 or connected directly to the device (on which UI 200 is being operated), as a USB interface to the computer. The terms "USB," "CDMA," "GPRS," and "WiFi" are well known in the art, hence a detailed discussion of these terms should not be required.

While the mobile application executing on devices 150 may be a native application that permanently resides on each device 150, it is also possible for the mobile application executing on each device 150 to be implemented using Javascript or the like that is downloaded and executed upon accessing a webpage provided by VDI or some connection broker. In this case, the device functionality is implemented entirely within a web browser that natively executes on mobile device 150. Technologies for desktop remoting over a browser are well known, such as that implemented by Thin-VNC™ by Cybele Software.

In one embodiment (not shown) UI 200 may list available target computers for which the user has access privileges, one of which may be selected by a user. Alternatively, a user may be asked to enter the host name (or network address) of a computer in computing environment 102. Each device 150 may be configured to connect to network 120 through any standard technology such as WiFi, GPRS, CDMA, etc. If a VPN connection is required, appropriate VPN settings may already be stored in the device to facilitate a VPN session.

After entering (or selecting) the name of a desired computer, if the computer requires, the user may be prompted to enter authentication information (e.g., user name and password, security key, etc.). Once successfully logged in, UI 200 may be displayed on the display screen of the mobile device. This creates a user session for the user to connect to the desired computer. A same user session is maintained for the user to allow the user to connect/disconnect multiple devices 150 to the desired computer.

In one embodiment, maintaining the same user session means sending the same user authentication data to the desired computer from multiple mobile devices. In this case, each device 150 may connect separately to the computer and provide the same authentication information. In other embodiments, devices 150 may connect amongst themselves to elect one of them to connect to and create a user session on behalf of all of them. In this case, one device 150 provides authentication information and then other devices 150 can connect to the same user session. An authentication between devices 150 may occur to allow one of the devices 150 to create the user session and then allow other devices 150 to connect to the same user session. For example, devices 150 may be found on a local area network (LAN). Also, if the elected device 150 is removed from the session, a process to elect another device 150 may be performed. In one embodiment, UI 200 displays a list (not shown) of already connected I/O devices. For example, when connect as monitor 202 option is selected, UI 200 notifies the user what other mobile devices have already been connected to the selected target computer. In one embodiment, the computer is configured to enable a selected number of mobile devices as a particular type of I/O device. For example, the computer may allow only one mobile device 150 to be used as a keyboard.

Figure 3:
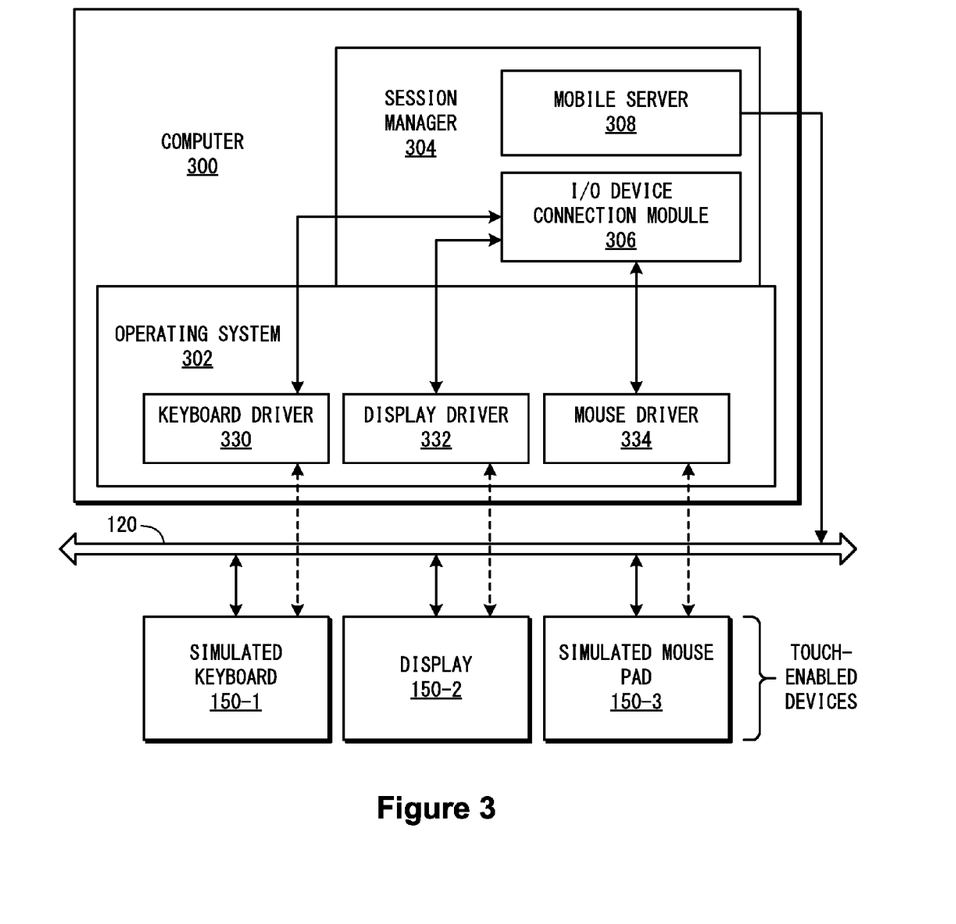
FIG. 3 illustrates a logical diagram of the system of FIG. 1 in which a target computer includes a session manager.

FIG. 3 illustrates a logical diagram of a target computer 300. Target computer 300 may reside within computing environment 102 of FIG. 1 Computer 300 may be a physical computer or a virtual computer (i.e., a virtual machine (VM)). In a virtualized environment, a physical computer may include one or more virtual computers or virtual machines. Hence, as noted above, computer 300, in a virtualized environment, may be a virtual machine running in a physical computer.

Figure 4:
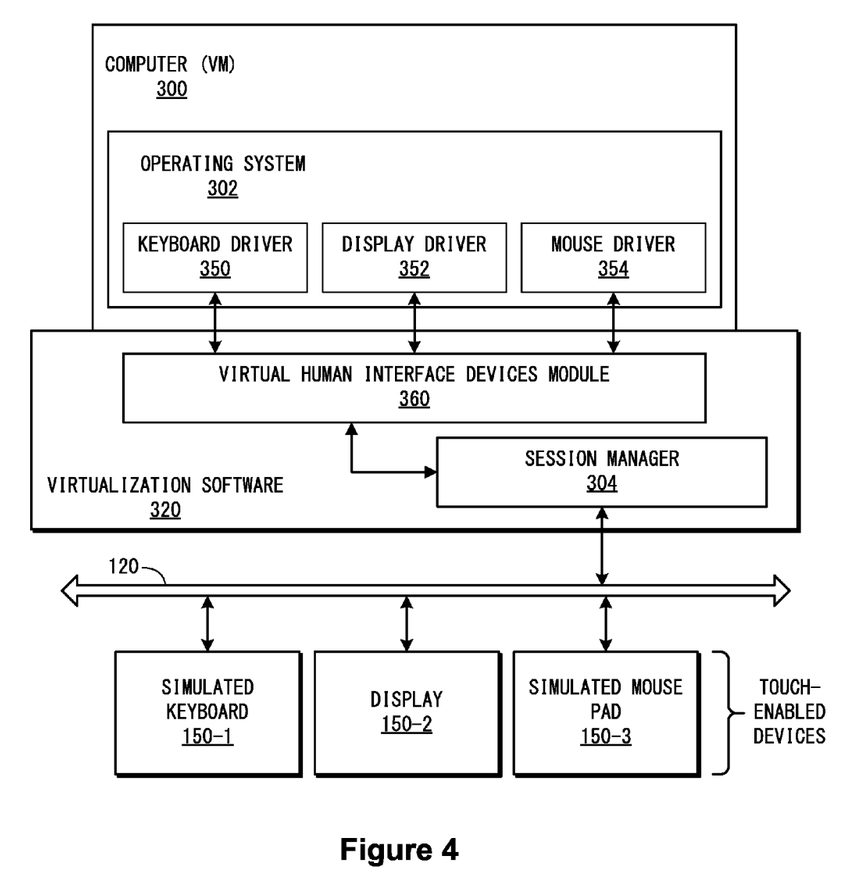
FIG. 4 illustrates a logical diagram of the system of FIG. 1 in which the target computer is virtualized.

Computer 300 includes an operating system 302 (OS) and a session manager 304, which may be implemented as an application running on OS 302. Session manager 304 facilitates session management, i.e., it manages a computing context of a logged in user. Session manager 304 may also run outside of computer 300, for example, in virtualization software as shown in FIG. 4, described in more detail below. It is also possible for session manager 304 to be incorporated into or based on a connection server or connection broker modules (not shown) if computer 300 is a part of a virtual desktop infrastructure.

In one embodiment, when a particular user logs into OS 302, session manager 304 retrieves configurations and settings (e.g., a user context) associated with the particular user. Session manager 304 is also includes a module to handle requests and commands originating from UI 200. Session manager 304 and the mobile application (which includes UI 200) works collaboratively to configure computer 300 and devices (e.g., Device 1, Device 2, etc.) so one or more devices may be configured to be used as one or more I/O device for computer 300 in a particular user session.

Session manager 304 may include a mobile server 308 and an I/O device connection module 306. Note that even though mobile server 308 and I/O device connection module 306 are shown inside session manager 304, mobile server 308 and I/O device connection module 306 may be located outside session manager 304 (e.g., as part of OS 302). However, irrespective of their locations, mobile server 308 is configured to facilitate communication between the mobile application (that includes UI 200) with session manager 304 and OS 302. Similarly, I/O device connection module 306 is configured to connect a device 150 to computer 300 in a requested configuration (e.g., connect Device 1 as a monitor of OS 302). In one embodiment, (not shown) I/O device connection module 306 encodes device I/O signals from remote devices 150 for input into the USB stack (not shown) of operating system 302 so that operating system 302 interprets user inputs from remote devices 150 as local USB connected devices. Although USB is cited here by way of example, of course any device connection technology may substitute.

In one example, when a user selects "connect as keyboard" option 204 in UI 200, mobile server 308 receives the request to be processed by session manager 304. The request is parsed and translated into pre-configured command or commands to enable session manager 304 and OS 302 to configure a keyboard device to receive keyboard inputs from requesting device 150. Mobile server 308 then communicates with I/O device connection module 306 to reserve the requested type I/O port for the requesting device. OS 302 is then configured to use the reserved I/O port as a keyboard I/O port (in this example). In other words, OS 302 is configured to use the reserved I/O port for sending and receiving keyboard signals instead of, or in addition to, the native keyboard I/O port of computer 300. Similarly, in another example, one or more devices 150 may be connected to computer 300 or OS 302 as monitors and mouse, etc. In another example, devices 150 may be connected to a target computer 300 as I/O devices using higher level API access in the operating system of computer 300, without using I/O ports of computer 300.

Typically, OS 302 is configured to communicate with I/O devices through appropriate device drivers for I/O devices including the keyboard, display, and mouse. Device drivers are software modules that enable OS 302 to communicate with devices connected to computer 300. A device driver for a particular device (e.g., a keyboard) typically implements two sets of interfaces. On one side, the device driver implements specific system calls exposed by OS 320 and on the other side, the device driver implements functions to enable communication between the device driver and the device in question. In the embodiment of FIG. 3, custom device drivers 330, 332, 334 are constructed for a particular type of device for a particular use (e.g., a smart phone as a keyboard) and also provides functionality translation of user inputs on device 150, as for example mouse (or touch pad) gestures, cursor magnification, etc. on device 150 will be translated by the device driver so OS 302 may understand user inputs. For example, a mobile device may have a camera, which a user would wish to connect to computer 300. A custom device driver may be loaded in OS 302 to enable discovery of the phone camera and translation of input data stream from the phone camera.

Typically, a device driver is OS 302 dependent in that different device drivers may be needed for different types of OS 302 (e.g., Microsoft Windows™, Unix™, Linux™, etc.). For example, a keyboard may be connected through computer's PS/2 port, or USB port or other I/O ports depending upon keyboard's connector configuration and availability of suitable device drivers compatible with OS 302. A custom device driver for each type of devices (e.g., monitor, keyboard, mouse pad, USB, etc.) to be emulated through the devices (e.g., Device 1, Device 2, etc. as shown in FIG. 1) may be pre-loaded in OS 302. Thus, as soon as I/O device connection module 306 notifies OS 302 that a particular type of I/O device has been connected to computer 300 through network 120, a suitable device driver is loaded in OS 302 and through the loaded device driver, OS 302 is configured to use the particular device in the requested configuration (e.g., as a monitor or as a keyboard, etc.).

Each device driver 330-334 may be installed and loaded when a particular type of emulated I/O device is used for the first time (e.g., through the plug-and-play functionality of OS 302). If session manager 304 is running within computer 300 as shown in FIG. 3, I/O device connection module 306 may itself be implemented as a device driver that includes logic to interact with OS 302 on behalf of the devices 150, typically through the I/O manager of OS 302.

In one embodiment, device drivers 330-334 may provide data and signal transformation functionality between the device and OS 302. In another embodiment, I/O device connection module 306, either independently or in conjunction with one or more device drivers, may provide signal translations between a connected device 150 and OS 302. For example, OS 302 may send data representing the graphical user interface (i.e., the computer display output) to be displayed on the connected device to session manager 304 or I/O device connection module 306 in a native format. Session manager 304 or I/O device connection module 306 translates the display data in the native format into a stream of data and may transmit the translated data to the connected device. Other protocols may be used based on their suitability for exchanging data with particular types of I/O devices that are configured to be emulated through the devices 150. In one example, a display remoting protocol such as RDP or PCoIP may be used for effecting data communication between a connected device 150 and computer 300. The PCoIP protocol, and other protocols, compresses, encrypts and encodes data for transmission across a standard network to stateless PCoIP-enabled client devices. In one embodiment, the mobile application (that includes UI 200), as noted above, that runs on each device 150 includes software code to make the device compliant with one or more protocols, such as PCoIP, VNC, RDP, etc., as may be the case.

In the embodiment FIG. 4, computer 300 is a virtual machine supported by virtualization software 320. Virtualization software 320 includes, for each running virtual machine, virtual human interface devices (HIDs) implemented by virtual HID module 360 that presents virtual devices accessed by device drivers 350-354 of operating system 302 as though they were physical devices (e.g., emulates the physical devices). In this embodiment, virtual HID module 360 may include drivers for using the mobile devices 150-1 to 150-3 as particular types of I/O devices. Virtual HID module 360 may be implemented as an MKS (for "mouse keyboard screen") module. In this case, virtualization software 320 may be configured to map a virtual HID for a virtual machine to a particular mobile device 150-1-150-3. In this embodiment, no custom drivers, as noted above, may be needed for OS 302.

Figure 5:
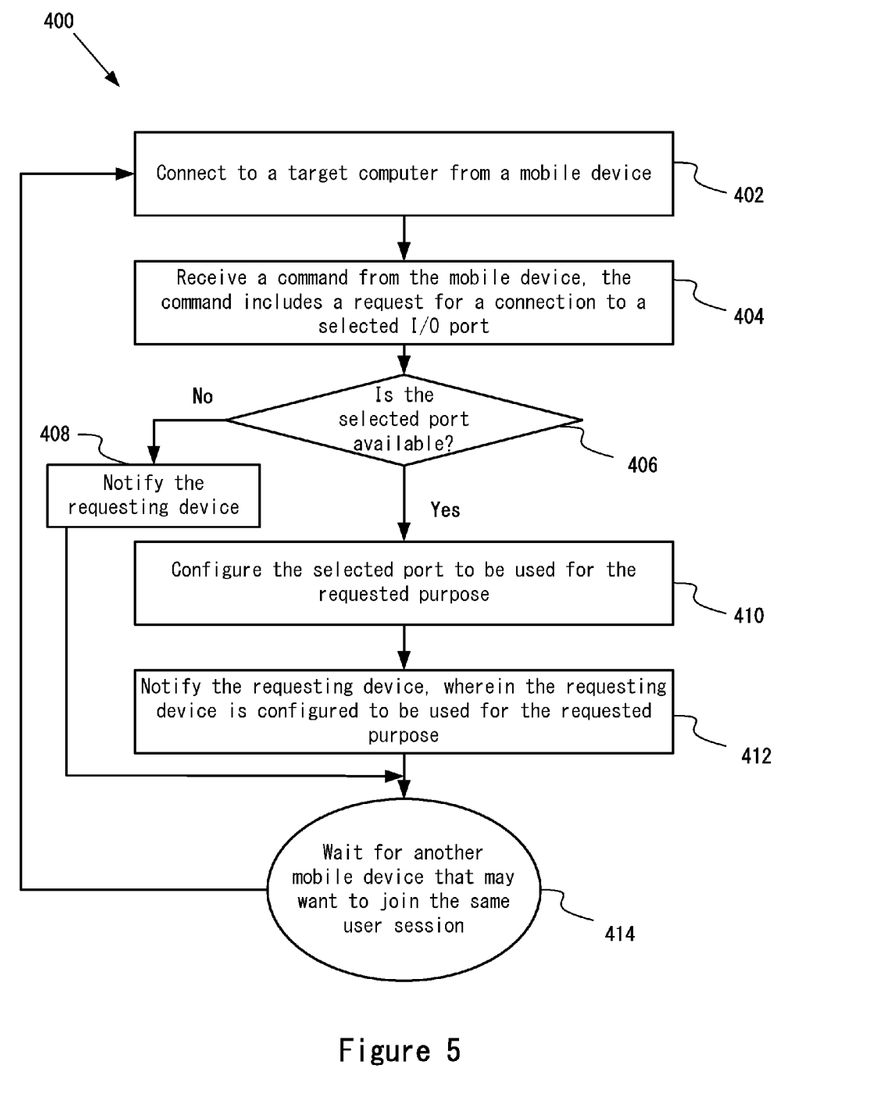
FIG. 5 illustrates a flow diagram of method steps for connecting, through a network, a plurality of mobile devices as I/O devices of a target computer, to a computer in accordance with one or more embodiments the present invention.

FIG. 5 illustrates a flow diagram 400 of an exemplary method steps for connecting, through network 120, a plurality of mobile devices 150 as I/O devices of computer 300. At step 402, mobile device 150 connects to computer 300 through network 120 using a mobile application (that includes UI 200). For example, if a user wants to use a smart phone as a keyboard, the user would run the mobile application on the smart phone and, using GUI 200, connect the smart phone to target computer 300. OS 302 in computer 300 creates a user session and loads a user context based on the login credentials sent from mobile device 150. At step 404, mobile device 150, though GUI 200, sends a message (or command) to session manager 304, which in one embodiment runs at computer 300. Session manager 304 receives the message, which may include information such as that mobile device 150 is to be used as a keyboard for computer 300.

At decision step 406, session manager 304 determines if OS 302 would allow a keyboard to be connected to computer 300. For example, if OS 302 only support one monitor and if mobile device 150 is attempting to be connected as a second monitor (that is, a monitor is already connected to computer 300), OS 300 may reject the connection request. If OS 302 does not allow connecting an additional I/O device to computer 300, at step 408, the requesting mobile device 150 will be notified accordingly. Otherwise, at step 410, OS 302 is configured to communicate in the requested configuration using a pre-selected I/O port for the requesting I/O type.

For example, when mobile device 150 in this example requests to be connected as a keyboard, session manager 304 loads a custom keyboard driver to enable OS 302 to communicate with mobile device 150 in the requested I/O configuration. OS 302 may remain agnostic to mobile device 150 so long as the custom keyboard driver is compliant with OS 302 and configured to communicate with mobile device 150 with respect to receiving keyboard (as in this example) inputs through network 120. Further, the pre-selected I/O port is configured (e.g., configuring IRQ, etc.) to enable mobile device 150 to use the pre-selected I/O port for sending keyboard (as in this example) inputs to OS 302.

At step 412, mobile device 150 is notified accordingly and the mobile application running in mobile device 150 configures mobile device 150 to be used as the selected type of I/O device by establishing a communication channel through network 120 with the appropriate driver. In the present example where the selected type of device is a keyboard, a communication channel is established with the keyboard driver that is loaded in OS 302. In one embodiment, mobile device 150 automatically shows a soft (or "simulated") keyboard on the entire or substantially entire (or according to the user specific settings) touch-sensitive display screen of the mobile device. The soft or simulated keyboard can then be interacted with by tapping the "keys" (images of keys on the display) to generate keyboard inputs into the target computer. In a similar manner, mobile device 150 that is configured for use as a mouse pad can display a mouse pad region (and left and right mouse buttons) that allows cursor control by interacting with the touch-screen of mobile device 150 as though it is a mouse pad, thereby providing mouse inputs.

At step 414, session manager 304 waits for similar I/O requests from other mobile devices 150, who would like to join the same user session. For example, another mobile device 150 may send a request to be connected to computer 300 as a monitor. Yet another device 150 may send a similar request to be connected to computer 300 in the same user session as a mouse. If another request is received, the control goes back to step 402 and the method steps 402-414 are repeated for the new mobile device.

Note that, in one embodiment, a same mobile device 150 may establish two separate communication channels, according to the above noted method steps, with computer 300 in the same user session. For example, the same mobile 150 device may connect to computer 300 as a monitor as well as a mouse.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The programming instructions and modules can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible/non-transitory medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for connecting a plurality of mobile devices to a computer, the computer having an operating system, the plurality of mobile devices including at least a first mobile device and a second mobile device, each of the plurality of mobile devices including a mobile application, the method comprising:

starting a user session by connecting the computer to the first mobile device, wherein the connecting includes receiving user authentication data at a session manager of the computer;

receiving, through the mobile application that is running in the first mobile device, a first message at the computer to connect the first mobile device as a first type of input/output (I/O) device;

upon receiving the first message, configuring the computer to use the first mobile device as the first type of I/O device;

receiving a connection at the computer from the second mobile device for the user session, wherein the session manager maintains a same user session using the second mobile device with the first mobile device;

receiving, through the mobile application that is running in the second mobile device, a second message at the computer to connect the second mobile device as a second type of input/output (I/O) device; and upon receiving the second message, configuring the computer to use the second mobile device as the second type of I/O device, the first type of I/O device and the second type of I/O device are each selected from a group comprising a mouse, a keyboard, a video camera, a display screen, an audio input device, an audio output device, and a USB hub, and the first type of I/O device is different from the second type of I/O device.

2. The method as recited in claim 1, wherein configuring of the computer to use the first mobile device as the first type of I/O device includes loading a first device driver, wherein the first device driver is configured to enable communication between the operating system and the first mobile device that is configured to be used as the first type of I/O device.

3. The method as recited in claim 1, wherein configuring of the computer to use the second mobile device as the second type of I/O device includes loading a second device driver, wherein the second device driver is configured to enable communication between the operating system and the second mobile device that is configured to be used as the second type of I/O device.

4. The method as recited in claim 1, wherein configuring of the computer to use the first mobile device or the second mobile device comprises:
determining a type of device for the first mobile device or the second mobile device; and
determining a device driver based on the type of device and the first type of I/O device or the second type of I/O device, wherein the device driver is configured for translation of an input data stream from the first mobile device or the second mobile device to the operating system to allow the first mobile device or the second mobile device to be used as the first type of I/O device or the second type of I/O device, respectively.

5. The method as recited in claim 4, further comprising:
receiving a user input for a function to be performed from the first mobile device or the second mobile device at the device driver;
translating the user input into a call to the operating system, the call corresponding to the function; and
providing the call to the operating system, wherein the operating system performs the function based on the call.

6. The method as recited in claim 1, wherein a communication between the operating system and the first mobile device is based on a display remoting protocol, wherein the first mobile device is configured to be connected to the computer as a display output.

7. The method as recited in claim 1, wherein:
the session manager runs in conjunction with the operating system on the target computer; and
the session manager includes a mobile server module, the mobile server module being configured to communicate with the mobile application and translate display data in a native format from the operating system into a data stream for the mobile application.

8. The method as recited in claim 1, wherein the session manager is further configured to maintain the same user session as devices among the plurality of mobile devices that are connected and disconnected to the computer as different types of I/O devices.

9. The method as recited in claim 1, wherein:
the computer is a virtual machine, and
virtualization software emulates the first type of I/O device and the second type of I/O device to the virtual machine.

10. The method as recited in claim 1, wherein:
the first mobile device is determined to be the mobile device to connect to the computer, and
the second mobile device connects to the computer through the second mobile device.

11. A system, comprising:
a plurality of mobile devices connected to a computer through a network, wherein each of the plurality of mobile devices includes a mobile application configured to emulate each of the plurality of mobile devices as a selected type of input/output (I/O) device for the computer; and
a session manager for the computer, the session manager operating in conjunction with an operating system for the computer and being configured to enable connecting the plurality of mobile devices as selected types of I/O devices to the computer in a same user session, wherein the operating system and the plurality of mobile devices are configured to collaboratively perform an operation of connecting the plurality of mobile devices to the computer, the plurality of mobile devices including a first mobile device and a second mobile device, the operation comprising:
starting a user session by connecting the computer to the first mobile device, wherein the connecting includes receiving user authentication data at the session manager of the computer;
receiving, through the mobile application that is running in the first mobile device, a first message at the computer to connect the first mobile device as a first type of input/output (I/O) device;
upon receiving the first message, configuring the computer to use the first mobile device as the first type of I/O device;
receiving a connection at the computer from the second mobile device for the user session, wherein the session manager maintains the same user session using the second mobile device with the first mobile device;
receiving, through the mobile application that is running in the second mobile device, a second message at the computer to connect the second mobile device as a second type of input/output (I/O) device; and
upon receiving the second message, configuring the computer to use the second mobile device as the second type of I/O device, the first type of I/O device and the second type of I/O device are each selected from a group comprising a mouse, a keyboard, a video camera, a display screen, an audio input device, an audio output device, and a USB hub, and the first type of I/O device is different from the second type of I/O device.

12. The system as recited in claim 11, wherein the configuring of the computer to use the first mobile device as the first type of I/O device includes loading a first device driver, the first device driver providing for communication between the operating system and the first mobile device that is configured to be used as the first type of I/O device.

13. The system as recited in claim 11, wherein configuring of the computer to use the second mobile device as the second type of I/O device includes loading a second device driver, the second device driver providing for communication between the operating system and the second mobile device that is configured to be used as the second type of I/O device.

14. The system as recited in claim 11, wherein configuring of the computer to use the first mobile device or the second mobile device comprises:
- determining a type of device for the first mobile device or the second mobile device;
- determining a device driver based on the type of device and the first type of I/O device or the second type of I/O device, wherein the device driver is configured for translation of an input data stream from the first mobile device or the second mobile device to the operating system to allow the first mobile device or the second mobile device to be used as the first type of I/O device or the second type of I/O device, respectively.

15. The system as recited in claim 14, further comprising:
- receiving a user input for a function to be performed from the first mobile device or the second mobile device at the device driver;
- translating the user input into a call to the operating system, the call corresponding to the function; and
- providing the call to the operating system, wherein the operating system performs the function based on the call.

16. The system as recited in claim 11, wherein:
- a communication between the operating system and one of the plurality of mobile devices is based on a display remoting protocol; and
- the first mobile device is connected to the computer as a monitor.

17. The system as recited in claim 11, wherein the session manager includes a mobile server module, wherein the mobile server module is configured to communicate with the mobile application and translate display data in a native format from the operating system into a data stream for commands from the mobile application.

18. The system as recited in claim 11, wherein the operating system includes device drivers to enable communication between applications running in the operating system with one or more of the plurality of mobile devices that are connected to the computer as selected types of I/O devices.

19. The system as recited in claim 11, wherein:
- the computer is a virtual machine, and
- virtualization software emulates the first type of I/O device and the second type of I/O device to the virtual machine.

20. A non-transitory computer readable storage medium containing a program which, when executed, performs an operation of connecting a plurality of mobile devices to a computer, the computer having an operating system, the plurality of mobile devices including at least a first mobile device and a second mobile device, each of the plurality of mobile devices including a mobile application, the operation comprising:
- starting a user session by connecting the computer to the first mobile device, wherein the connecting includes receiving user authentication data at a session manager of the computer;
- receiving, through the mobile application that is running in the first mobile device, a first message at the computer to connect the first mobile device as a first type of input/output (I/O) device;
- upon receiving the first message, configuring the computer to use the first mobile device as the first type of I/O device;
- receiving a connection at the computer from the second mobile device for the user session, wherein the session manager maintains a same user session using the second mobile device with the first mobile device;
- receiving, through the mobile application that is running in the second mobile device, a second message at the computer to connect the second mobile device as a second type of input/output (I/O) device; and
- upon receiving the second message, configuring the computer to use the second mobile device as the second type of I/O device, the first type of I/O device and the second type of I/O device are each selected from a group comprising a mouse, a keyboard, a video camera, a display screen, an audio input device, an audio output device, and a USB hub, and the first type of I/O device is different from the second type of I/O device.

21. The non-transitory computer readable storage medium as recited in claim 20, wherein configuring of the computer to use the first mobile device as the first type of I/O device includes loading a first device driver, wherein the first device driver is configured to enable communication between the operating system and the first mobile device that is configured to be used as the first type of I/O device.

22. The non-transitory computer readable storage medium as recited in claim 20, wherein configuring of the computer to use the second mobile device as the second type of I/O device includes loading a second device driver, wherein the second device driver is configured to enable communication between the operating system and the second mobile device that is configured to be used as the second type of I/O device.

* * * * *